(12) United States Patent
Willett, Jr.

(10) Patent No.: US 10,344,599 B2
(45) Date of Patent: Jul. 9, 2019

(54) COOLING PASSAGE FOR GAS TURBINE ROTOR BLADE

(71) Applicant: General Electric Company, Schenectady, NY (US)

(72) Inventor: Fred Thomas Willett, Jr., Burnt Hills, NY (US)

(73) Assignee: General Electric Company, Schenectady, NY (US)

(*) Notice: Subject to any disclaimer, the term of this patent is extended or adjusted under 35 U.S.C. 154(b) by 393 days.

(21) Appl. No.: 15/163,027

(22) Filed: May 24, 2016

(65) Prior Publication Data
US 2017/0342843 A1    Nov. 30, 2017

(51) Int. Cl.
| | |
|---|---|
| F02C 7/12 | (2006.01) |
| F01D 5/18 | (2006.01) |
| F01D 5/22 | (2006.01) |
| F01D 11/08 | (2006.01) |
| F02C 3/04 | (2006.01) |

(52) U.S. Cl.
CPC ............. F01D 5/187 (2013.01); F01D 5/225 (2013.01); F01D 11/08 (2013.01); F02C 3/04 (2013.01); F05D 2220/32 (2013.01); F05D 2240/307 (2013.01); F05D 2240/35 (2013.01); F05D 2260/202 (2013.01); F05D 2260/2212 (2013.01); Y02T 50/676 (2013.01)

(58) Field of Classification Search
CPC .......... F01D 11/08; F01D 5/187; F01D 5/225; F02C 3/04; F05D 2220/32; F05D 2240/307; F05D 2240/35; F05D 2260/202; F05D 2260/2212
See application file for complete search history.

(56) References Cited

U.S. PATENT DOCUMENTS

| | | | | |
|---|---|---|---|---|
| 6,099,253 A | * | 8/2000 | Fukue | F01D 5/187 416/191 |
| 6,471,480 B1 | * | 10/2002 | Balkcum, III | F01D 5/186 415/115 |
| 6,499,950 B2 | * | 12/2002 | Willett | F01D 5/182 416/97 R |
| 6,761,534 B1 | * | 7/2004 | Willett | F01D 5/18 416/191 |
| 6,811,378 B2 | * | 11/2004 | Kraft | F01D 5/18 416/191 |
| 7,686,581 B2 | | 3/2010 | Brittingham et al. | |
| 7,901,180 B2 | * | 3/2011 | Abdel-Messeh | F01D 5/187 415/115 |
| 7,946,816 B2 | | 5/2011 | Brittingham | |

(Continued)

OTHER PUBLICATIONS

Extended European Search Report and Opinion issued in connection with corresponding EP Application No. 17170989.2 dated Oct. 25, 2017.

Primary Examiner — Jesse S Bogue
(74) Attorney, Agent, or Firm — Charlotte C. Wilson

(57) ABSTRACT

The present disclosure is directed to a rotor blade for a gas turbine engine. The rotor blade includes an airfoil, a tip shroud having a side surface and a radially outer surface, and a transition portion coupling the tip shroud to the airfoil. The airfoil, the transition portion, and the tip shroud collectively define a primary cooling passage therein. The primary cooling passage includes a primary cooling passage outlet defined by the side surface of the tip shroud.

18 Claims, 8 Drawing Sheets

(56) References Cited

U.S. PATENT DOCUMENTS

| | | | |
|---|---|---|---|
| 7,946,817 B2 | 5/2011 | Brittingham | |
| 8,057,177 B2 * | 11/2011 | Brittingham | F01D 5/187 416/189 |
| 8,322,986 B2 * | 12/2012 | DeSander | F01D 5/187 416/96 R |
| 8,348,612 B2 * | 1/2013 | Brittingham | F01D 5/225 416/191 |
| 8,956,104 B2 * | 2/2015 | Lacy | F01D 5/225 415/115 |
| 10,156,145 B2 * | 12/2018 | Chouhan | F01D 5/02 |
| 2013/0142649 A1 * | 6/2013 | Collier | F01D 5/187 416/1 |
| 2013/0323079 A1 | 12/2013 | Martin et al. | |
| 2017/0173669 A1 | 6/2017 | Moricca et al. | |
| 2017/0173680 A1 | 6/2017 | Rutkowski | |

\* cited by examiner

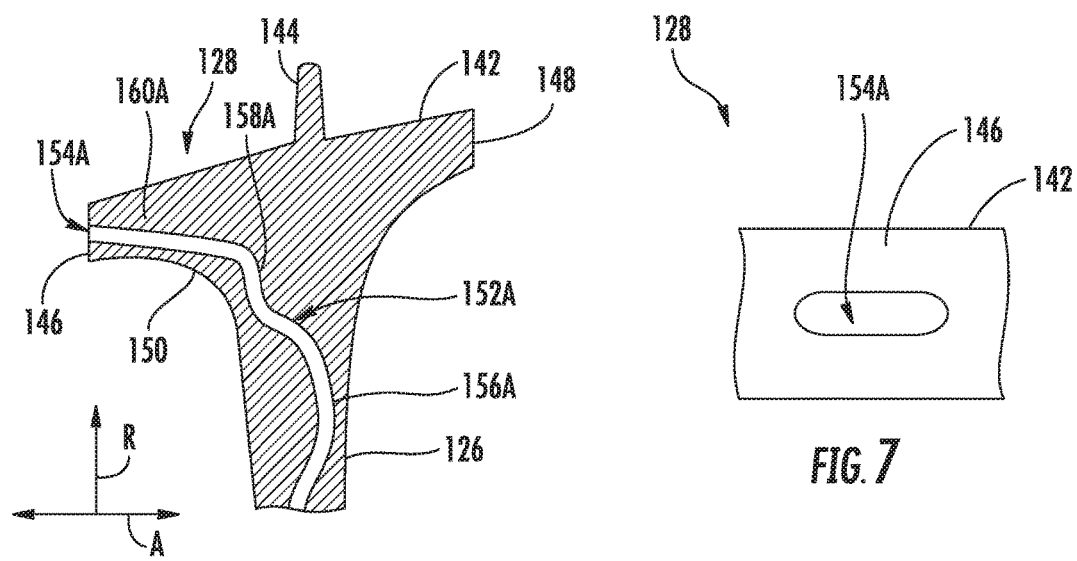
FIG. 6
FIG. 7
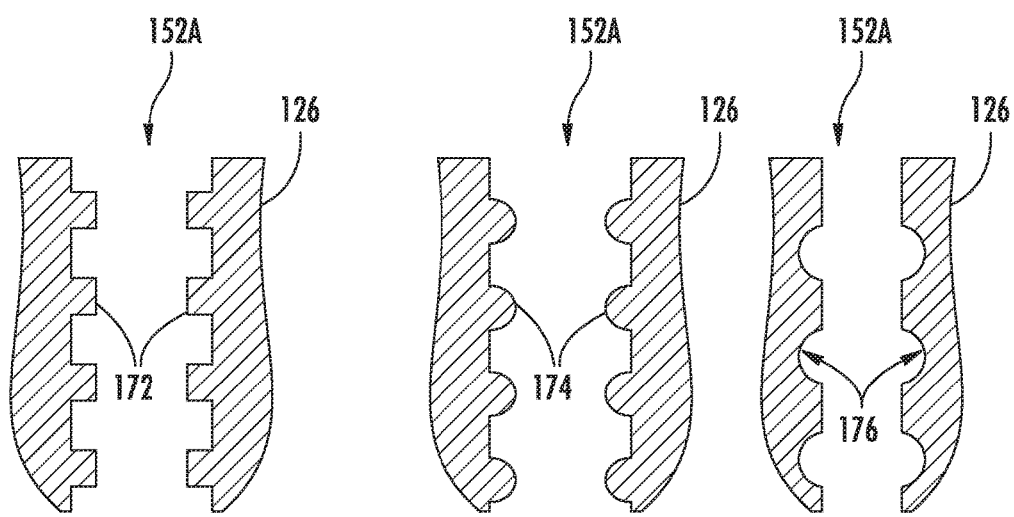
FIG. 8A
FIG. 8B
FIG. 8C

COOLING PASSAGE FOR GAS TURBINE ROTOR BLADE

FIELD OF THE TECHNOLOGY

The present disclosure generally relates to a gas turbine engine. More particularly, the present disclosure relates to a rotor blade for a gas turbine engine.

BACKGROUND

A gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

The turbine section includes a plurality of rotor blades, which extract kinetic energy and/or thermal energy from the combustion gases flowing therethrough. In certain embodiments, some or all of the plurality of rotor blades include a tip shroud coupled to an airfoil portion by a fillet portion. These rotor blades generally operate in extremely high temperature environments. As such, the rotor blades typically include one or more cooling passages defined therein. During operation of the gas turbine engine, a cooling medium such as compressed air flows through the one or more cooling passages to cool the rotor blade. Nevertheless, the conventional cooling passage configurations that provide adequate cooling to the fillet portion and the tip shroud increase the weight of the rotor blade, which may be undesirable.

BRIEF DESCRIPTION OF THE TECHNOLOGY

Aspects and advantages of the technology will be set forth in part in the following description, or may be obvious from the description, or may be learned through practice of the technology.

In one aspect, the present disclosure is directed to a rotor blade for a gas turbine engine. The rotor blade includes an airfoil, a tip shroud having a side surface and a radially outer surface, and a transition portion coupling the tip shroud to the airfoil. The airfoil, the transition portion, and the tip shroud collectively define a primary cooling passage therein. The primary cooling passage includes a primary cooling passage outlet defined by the side surface of the tip shroud.

A further aspect of the present disclosure is directed to a gas turbine engine having a compressor portion, a combustion portion, and a turbine portion. The turbine portion includes one or more rotor blades. Each rotor blade includes an airfoil, a tip shroud having a side surface and a radially outer surface, and a transition portion coupling the tip shroud to the airfoil. The airfoil, the transition portion, and the tip shroud collectively define a primary cooling passage therein. The primary cooling passage includes a primary cooling passage outlet defined by the side surface of the tip shroud.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended FIGS., in which:

FIG. 6 a cross-sectional view of the airfoil and the tip shroud taken generally about line 5-5 in FIG. 4, illustrating another embodiment of the first primary cooling passage;

FIG. 7 is a front view of a portion of the tip shroud, illustrating a first primary cooling passage outlet;

FIG. 8A is an enlarged cross-sectional view of the first primary cooling passage illustrating one embodiment of one or more turbulators;

FIG. 8B is an enlarged cross-sectional view of the first primary cooling passage illustrating an alternate embodiment of the one or more turbulators;

FIG. 8C is an enlarged cross-sectional view of the first primary cooling passage illustrating a further embodiment of the one or more turbulators;

Figure 1:
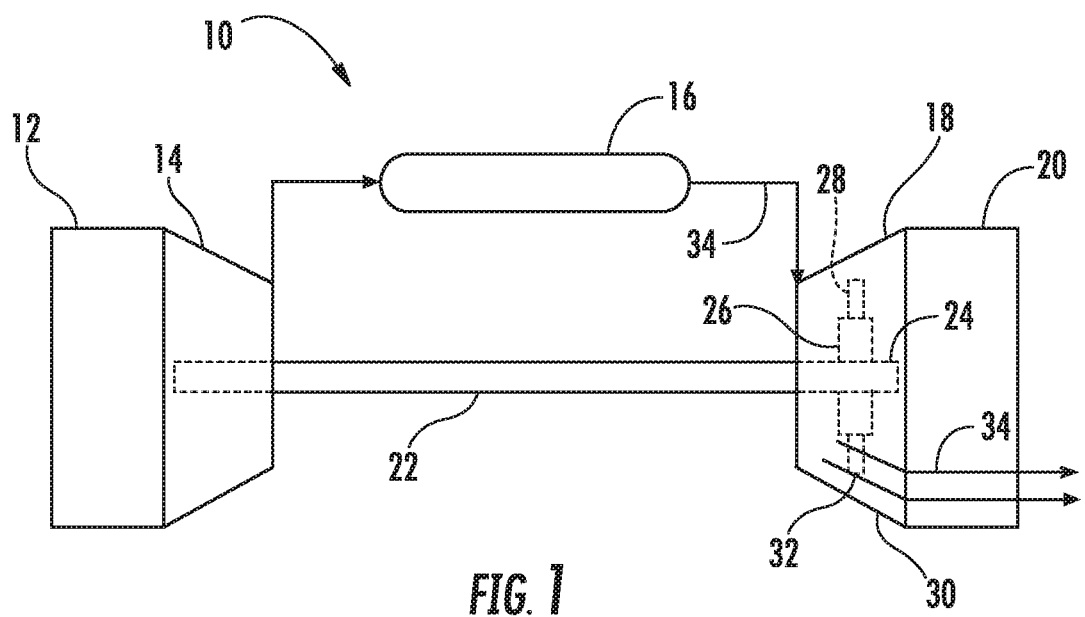
FIG. 1 is a schematic view of an exemplary gas turbine engine that may incorporate various embodiments disclosed herein.

Repeat use of reference characters in the present specification and drawings is intended to represent the same or analogous features or elements of the present technology.

DETAILED DESCRIPTION OF THE TECHNOLOGY

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents. Although an industrial or land-based gas turbine is shown and described herein, the present technology as shown and described herein is not limited to a land-based and/or industrial gas turbine unless otherwise specified in the claims. For example, the technology as described herein may be used in any type of turbine including, but not limited to, aviation gas turbines (e.g., turbofans, etc.), steam turbines, and marine gas turbines.

Referring now to the drawings, wherein identical numerals indicate the same elements throughout the figures, FIG. 1 schematically illustrates a gas turbine engine 10. It should be understood that the turbine engine 10 of the present disclosure need not be a gas turbine engine, but rather may be any suitable turbine engine, such as a steam turbine engine or other suitable engine. The gas turbine engine 10 may include an inlet section 12, a compressor section 14, a combustion section 16, a turbine section 18, and an exhaust section 20. The compressor section 14 and turbine section 18 may be coupled by a shaft 22. The shaft 22 may be a single shaft or a plurality of shaft segments coupled together to form the shaft 22.

The turbine section 18 may generally include a rotor shaft 24 having a plurality of rotor disks 26 (one of which is shown) and a plurality of rotor blades 28 extending radially outwardly from and being interconnected to the rotor disk 26. Each rotor disk 26 in turn, may be coupled to a portion of the rotor shaft 24 that extends through the turbine section 18. The turbine section 18 further includes an outer casing 30 that circumferentially surrounds the rotor shaft 24 and the rotor blades 28, thereby at least partially defining a hot gas path 32 through the turbine section 18.

During operation, air or another working fluid flows through the inlet section 12 and into the compressor section 14, where the air is progressively compressed to provide pressurized air to the combustors (not shown) in the combustion section 16. The pressurized air is mixed with fuel and burned within each combustor to produce combustion gases 34. The combustion gases 34 flow along the hot gas path 32 from the combustion section 16 into the turbine section 18, where energy (kinetic and/or thermal) is transferred from the combustion gases 34 to the rotor blades 28, thus causing the rotor shaft 24 to rotate. The mechanical rotational energy may then be used to power the compressor section 14 and/or to generate electricity. The combustion gases 34 exiting the turbine section 18 may then be exhausted from the gas turbine engine 10 via the exhaust section 20.

Figure 2:
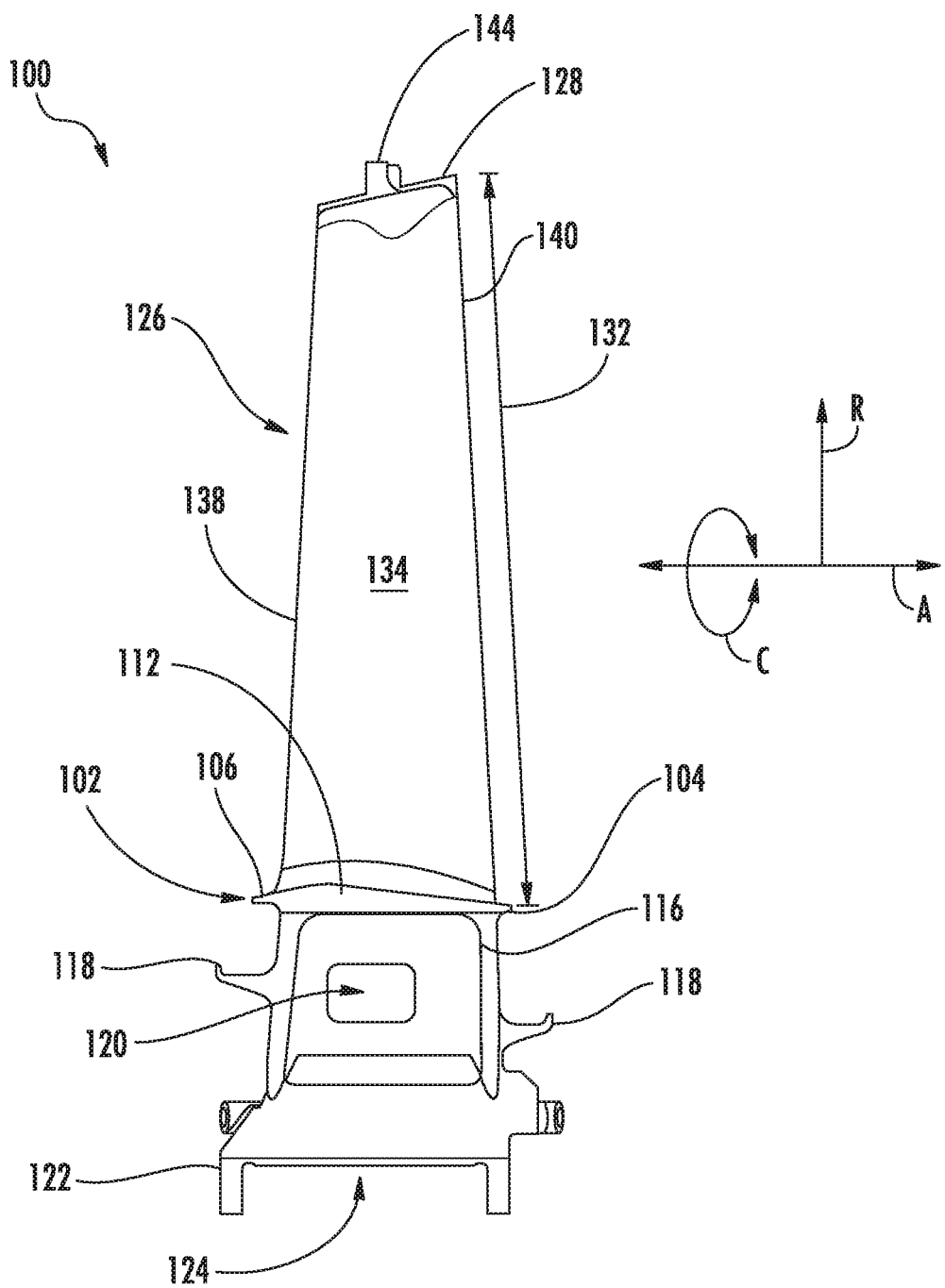
FIG. 2 is a front view of an exemplary rotor blade that may be incorporated in the gas turbine shown in FIG. 1 in accordance with the embodiments disclosed herein.
Figure 3:
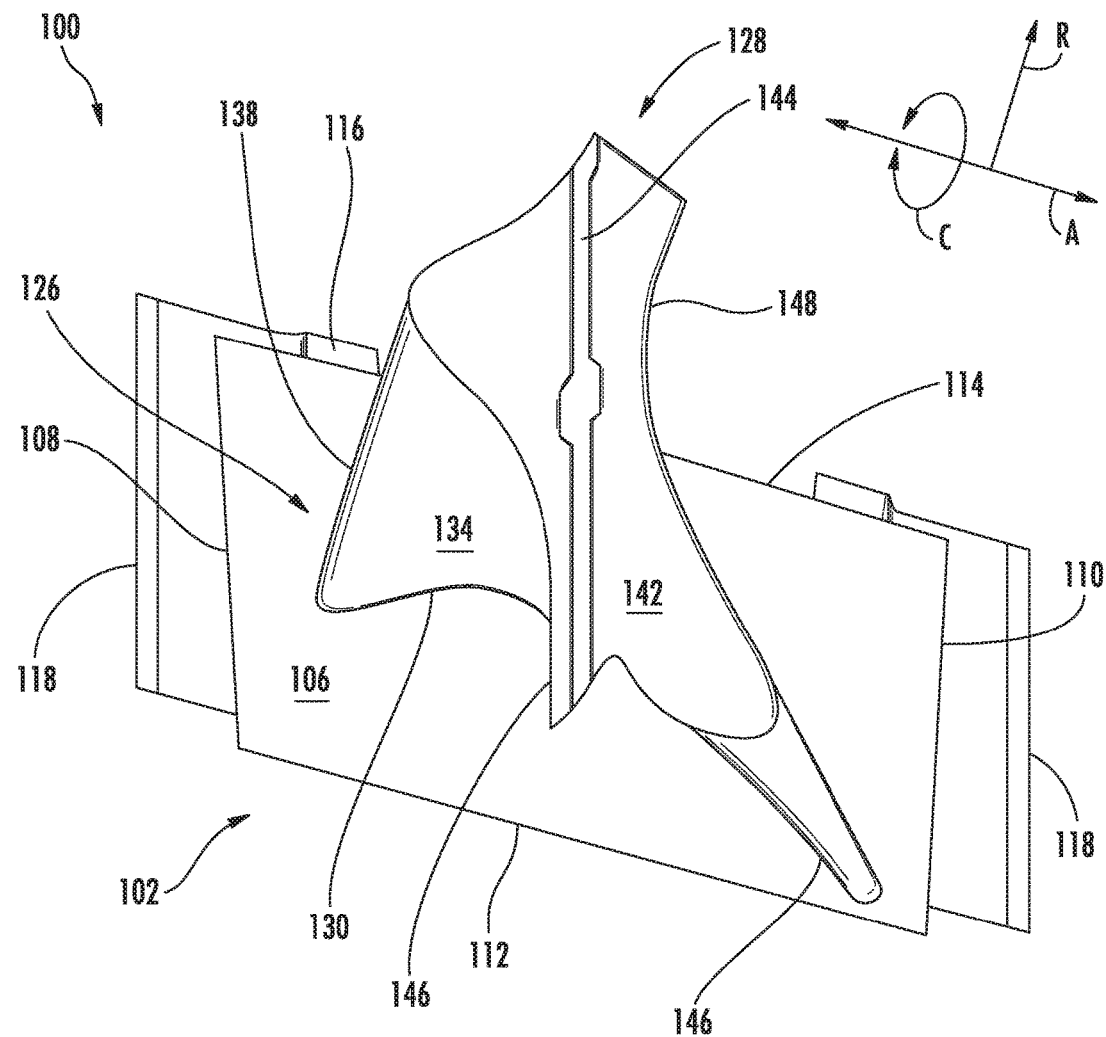
FIG. 3 is a top view of the exemplary rotor blade shown in FIG. 2, further illustrating the various features thereof.

FIGS. 2 and 3 are views of an exemplary rotor blade 100, which may incorporate one or more embodiments disclosed herein and may be incorporated into the turbine section 18 of the gas turbine engine 10 in place of the rotor blade 28 as shown in FIG. 1. As illustrated in FIGS. 2 and 3, the rotor blade 100 defines an axial direction A, a radial direction R, and a circumferential direction C. The radial direction R extends generally orthogonal to the axial direction A, and the circumferential direction C extends generally concentrically around the axial direction A.

As illustrated in FIGS. 2 and 3, the rotor blade 100 includes a platform 102, which generally serves as a radially inward flow boundary for the combustion gases 34 flowing through the hot gas path 32 of the turbine section 18 (FIG. 1). More specifically, the platform 102 includes a radially inner surface 104 radially spaced apart from a radially outer surface 106. The platform 102 also includes a leading edge 108 axially spaced apart from a trailing edge 110. The leading edge 108 is positioned into the flow of combustion gases 34, and the trailing edge 110 is positioned downstream from the leading edge 108. Furthermore, the platform 102 includes a pressure-side slash face 112 circumferentially spaced apart from a suction-side slash face 114.

As shown in FIG. 2, the rotor blade 100 includes a shank portion 116 that extends radially inwardly from the radially inner surface 104 of the platform 102. One or more angel wings 118 may extend axially outwardly from the shank portion 116. The shank portion 116 and the platform 102 collectively define a shank pocket 120 in the embodiment shown in FIG. 2. Nevertheless, the shank portion 116 and the platform 102 may not define a shank pocket 120 in some embodiments.

The rotor blade 100 also includes a root portion 122, which extends radially inwardly from a shank portion 116. The root portion 122 may interconnect or secure the rotor blade 100 to the rotor disk 26 (FIG. 1). In the embodiment shown in FIG. 2, the root portion 122 has a fir tree configuration. Nevertheless, the root portion 122 may have any suitable configuration (e.g., a dovetail configuration, etc.) as well. Furthermore, the root portion 122 may define an intake port 124, which permits cooling air to enter the rotor blade 100.

The rotor blade 100 further includes an airfoil 126 that extends radially outwardly from the radially outer surface 106 of the platform 102 to a tip shroud 128. As such, the tip shroud 128 may generally define the radially outermost portion of the rotor blade 100. The airfoil 126 couples to the platform 102 at an airfoil root 130 (i.e., the intersection between the airfoil 126 and the platform 102). In some embodiments, the airfoil root 130 may be a radius or fillet (not shown) that transitions between the airfoil 126 and the platform 102. In this respect, the airfoil 126 defines an airfoil span 132 extending between the airfoil root 130 and the tip shroud 128. The airfoil 126 also includes a pressure-side wall 134 and an opposing suction-side wall 136. The pressure-side wall 134 and the suction-side wall 136 are joined together or interconnected at a leading edge 138 of the airfoil 126, which is oriented into the flow of combustion gases 34. The pressure-side wall 134 and the suction-side wall 136 are also joined together or interconnected at a trailing edge 140 of the airfoil 126, which is spaced downstream from the leading edge 138. The pressure-side wall 134 and the suction-side wall 136 are continuous about the leading edge 138 and the trailing edge 140. The pressure-side wall 134 is generally concave, and the suction-side wall 136 is generally convex.

Figure 4:
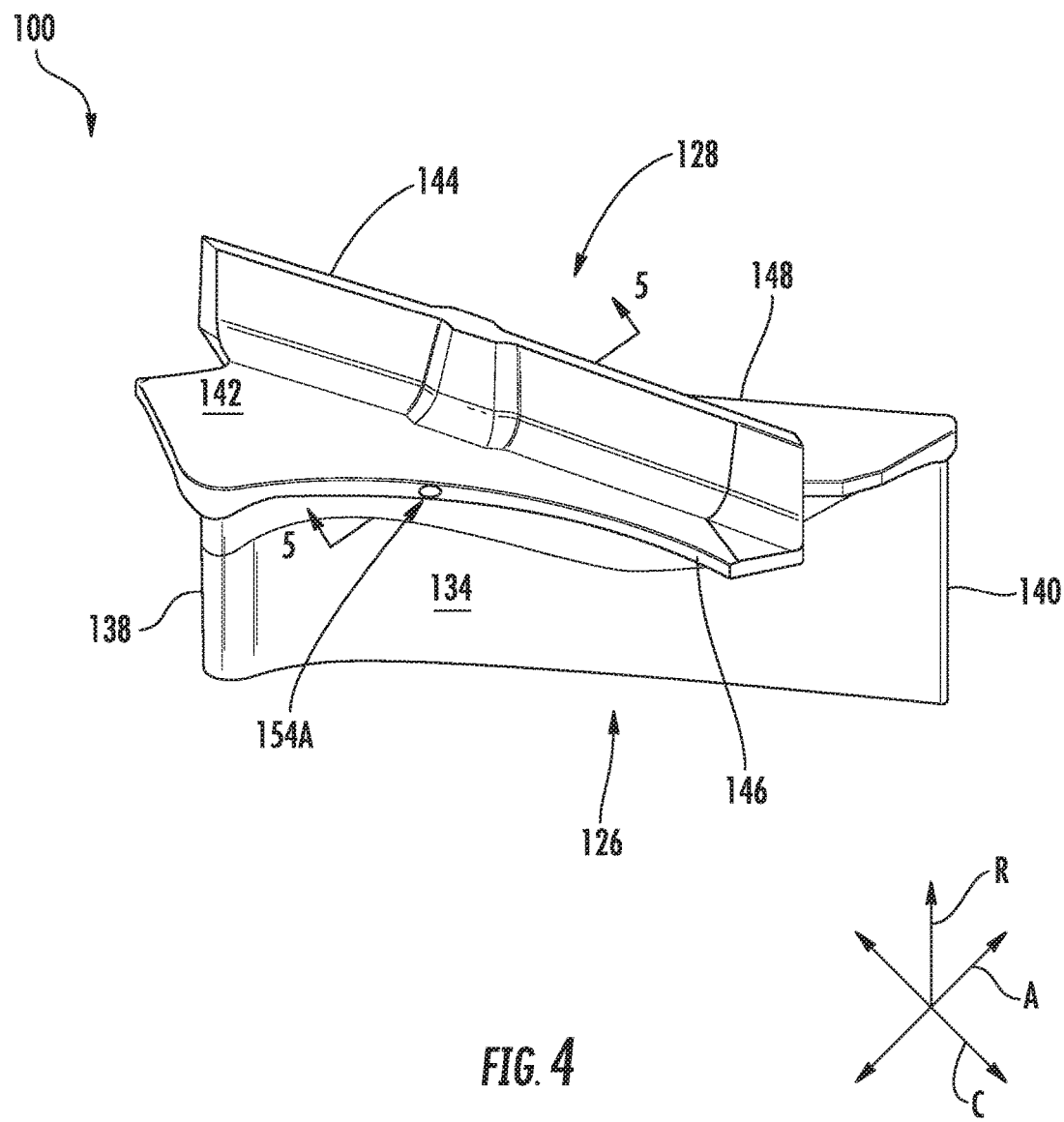
FIG. 4 is an enlarged perspective view of a portion of the rotor blade shown in FIGS. 2 and 3, illustrating a radially outer portion of an airfoil and a tip shroud.

As mentioned above, the tip shroud 128 is positioned at the radially outer end of the rotor blade 100. The tip shroud 128 reduces the amount of the combustion gases 34 that escape past the rotor blade 100. In the embodiment shown in FIGS. 3 and 4, the tip shroud 128 includes a radially outer surface 142 having a rail 144 extending radially outwardly therefrom. Alternate embodiments may include more rails 144 (e.g., two rails 144, three rails 144, etc.) or no rails 144 at all. The tip shroud 128 also includes a pressure-side side surface 146 and a suction-side side surface 148, which are interconnected at the leading edge 138 and the trailing edge 140 of the airfoil 126. In the embodiment shown in FIG. 3, the pressure-side and the suction-side side surface 146, 148 generally do not align with the pressure-side and suction-side walls 134, 136 of the airfoil 126. Furthermore, the tip shroud 128 includes a radially inner surface 178 positioned radially inwardly from the radially outer surface 142 thereof.

Figure 5:
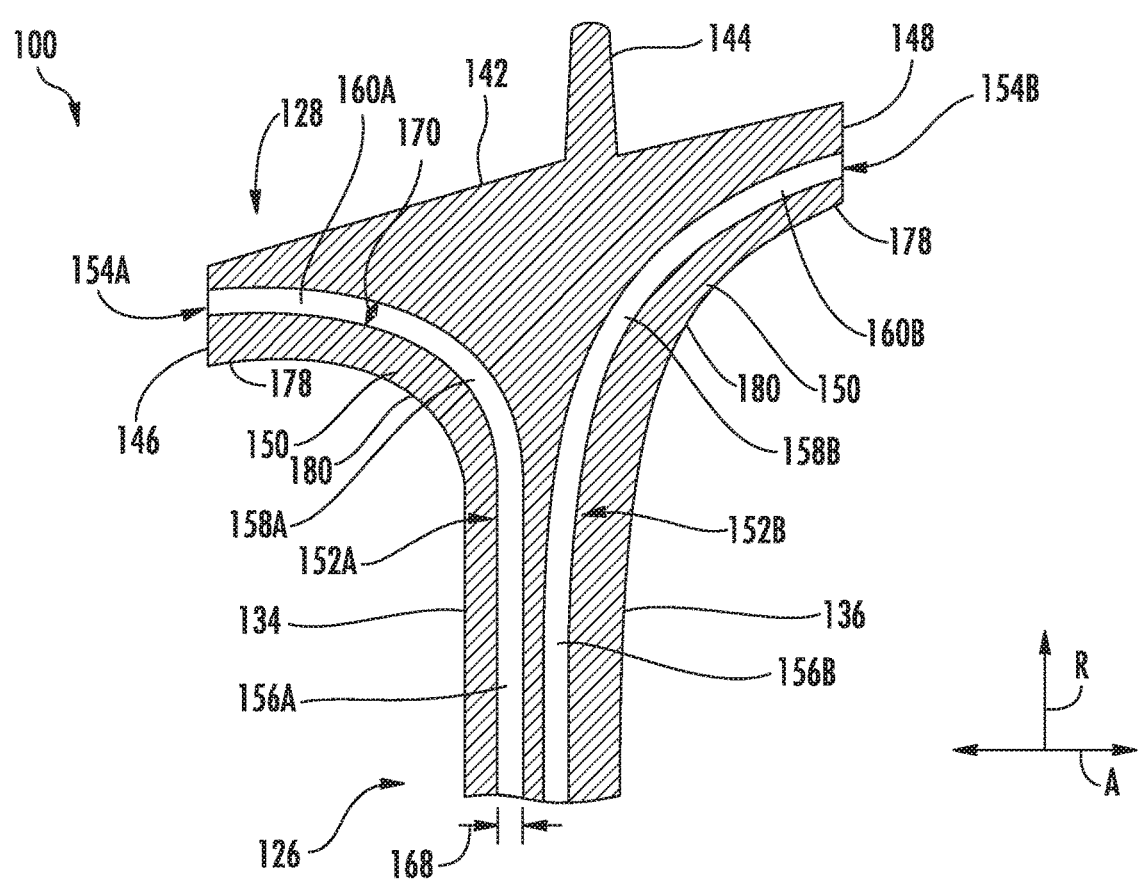
FIG. 5 is a cross-sectional view of the airfoil and the tip shroud taken generally about line 5-5 in FIG. 4, illustrating one embodiment of a first primary cooling passage and a second primary cooling passage.

Referring now to FIG. 5, a transition portion 150 couples the tip shroud 128 to the radially outer end of the airfoil 126. That transition portion 150 includes an outer surface 180, which is exposed to the combustion gases 34 in the hot gas path 32. The outer surface 180 couples the outer surfaces of the pressure-side and suction side walls 134, 136 of the airfoil 126 to the radially inner surface 178 of the tip shroud 128. In the embodiment shown in FIGS. 5 and 6, the transition portion 150 is a fillet portion that transitions between the airfoil 126 and the tip shroud 128. In alternate embodiments, the transition portion 150 may include a chamfer (not shown) or other suitable transition between the airfoil 126 and the tip shroud 128.

The rotor blade 100 defines one or more cooling primary passages therein through which cooling air flows. In the embodiment illustrated in FIG. 5, the airfoil 126, the transition portion 150, and the tip shroud 128 collectively define a first primary cooling passage 152A and a second primary cooling passage 152B therein. Nevertheless, the rotor blade 100 may define fewer or more primary cooling passages as are necessary or desired. In fact, the rotor blade 100 may define any number of primary cooling passages so long as the rotor blade 100 defines at least one primary cooling passage.

Each of the first and the second primary cooling passages 152A, 152B include a corresponding inlet. In some embodiments, the intake port 124 (FIG. 2) defined by the root portion 122 may be the inlet for the first and the second primary cooling passages 152A, 152B. In such embodiments, the root portion 122, the shank portion 116, the platform 102, the airfoil 126, the transition portion 150, and the tip shroud 128 collectively define the first and the second primary cooling passages 152A, 152B therein. In other embodiments, the inlets of the first and the second primary cooling passages 152A, 152B may couple to any of the chambers, passages, or cavities (e.g., the shank pocket 120) defined by the root portion 122, the shank portion 116, the platform 102, and/or the airfoil 126.

The first and the second primary cooling passages 152A, 152B respectively terminate at a first primary cooling passage outlet 154A and a second primary cooling passage outlet 154B. Both of the first and the second primary cooling passage outlets 154A, 154B are defined by the tip shroud 128. In the embodiment shown in FIG. 5, the pressure-side side surface 146 of the tip shroud 128 defines the first primary cooling passage outlet 154A, while the suction-side side surface 148 of the tip shroud 128 defines the second primary cooling passage outlet 154B. Nevertheless, each of the first and the second primary cooling passage outlets 154A, 154B may be defined by either of the pressure-side side surface 146 or the suction-side side surface 148 of the tip shroud 128.

As mentioned above, the airfoil 126, the transition portion 150, and the tip shroud 128 collectively define the first and the second primary cooling passages 152A, 152B therein. More specifically, the airfoil 126 defines an airfoil portion 156A of the first primary cooling passage 152A and an airfoil portion 156B of the second primary cooling passage 152B. The transition portion 150 of the rotor blade 100 defines a transition portion 158A of the first primary cooling passage 152A and a transition portion 158B of the second primary cooling passage 152B. Preferably, the transition portions 158A, 158B should be positioned proximate to the outer surface 180 of the transition portion 150 of the rotor blade 100 to increase cooling thereof. That is, the closer the transition portions 158A, 158B of the first and the second primary cooling passages 152A, 152B are to the outer surface 180 of the transition portion 150, the greater the cooling. The tip shroud 128 defines a tip shroud portion 160A of the first primary cooling passage 152A and a tip shroud portion 160B of the second primary cooling passage 152B therein.

FIGS. 5 and 6 illustrate different configurations of the airfoil portions 156A, 156B, the transition portions 158A, 158B, and the tip shroud portions 160A, 160B of the first and the second primary cooling passages 152A, 152B. FIG. 6 omits the second primary cooling passage 152B for clarity purposes. In the embodiment shown in FIG. 5, the airfoil portions 156A, 156B of the first and the second primary cooling passages 152A, 152B are linear, while the transition portions 158A, 158B and the tip shroud portions 160A, 160B of the first and the second primary cooling passages 152A, 152B are curvilinear. In the embodiment shown in FIG. 6, however, the airfoil portion 156A and the transition portion 158A of the first primary cooling passage 152A are curvilinear, while the tip shroud portion 160A is linear. Nevertheless, any of the airfoil portions 156A, 156B, the transition portions 158A, 158B, and the tip shroud portions 160A, 160B of the first and the second primary cooling passages 152A, 152B may be linear, curvilinear, or any combination thereof.

As mentioned above, the transition portion 150 of the rotor blade 100 has a fillet portion and the second transition portion 158B of the second primary cooling passage 152B is curvilinear in the embodiment shown in FIG. 5. In this embodiment, the curvature of the second transition portion 158B of the second primary cooling passage 152B generally follows the curvature of the fillet portion. That is, the transition portion 158B of the second primary cooling passage 152B is uniformly spaced apart from an outer surface of the fillet portion along the entire length of the fillet portion. The curvature of the first transition portion 158A of the first primary cooling passage 152A may also generally follow the curvature of the fillet portion. Nevertheless, the curvatures of the first and the second transition portions 158A, 158B of the first and the second primary cooling passages 152A, 152B may not follow the curvature of the fillet portion in some embodiments.

The first and the second primary cooling passages 152A, 152B and the corresponding first and the second primary cooling passage outlets 154A, 154B may have any suitable cross-sectional shape. In one embodiment, the first and the second primary cooling passages 152A, 152B and the corresponding first and the second primary cooling passage outlets 154A, 154B have a circular cross-sectional shape. In other embodiments, the first and the second primary cooling passages 152A, 152B and the corresponding first and the second primary cooling passage outlets 154A, 154B may have an ovoid or oval shape as illustrated in FIG. 7. The pressure-side and/or suction-side side surfaces 146, 148 may be thinner (i.e., shorter in the radial direction R) if the corresponding first and/or the second primary cooling passage outlets 154A, 154B have an ovoid cross-section. Nevertheless, the first and the second primary cooling passages 152A, 152B and the corresponding first and the second primary cooling passage outlets 154A, 154B may be any suitable cross-sectional shape. The first primary cooling passage 152A and the first primary cooling passage outlet 154A may have the same cross-sectional shape or a different cross-sectional shape than the second primary cooling passage 152B and the second primary cooling passage outlet 154B. In some embodiments, the first and the second primary cooling passages 152A, 152B may have different cross-sectional shapes than the corresponding first and second primary cooling passage outlets 154A, 154B. The first and the second primary cooling passages 152A, 152B preferably have a constant diameter. Nevertheless, the diameters of the first and/or the second primary cooling passages 152A, 152B may vary along the length thereof. In the embodiment shown in FIG. 5, for example, the first primary cooling passage 152A has a first diameter 168 that is less than a second diameter 170.

Each of the first and the second primary cooling passages 152A, 152B may include one or more turbulators positioned therein. The one or more turbulators create turbulence in the cooling air flowing through the corresponding primary cooling passage 152A, 152B, thereby increasing the rate of heat transfer between the rotor blade 100 and the cooling air. FIGS. 8A-8C illustrate various embodiments of the turbulators. For example, the one or more turbulators may be one or more rectangular projections 172 (FIG. 8A), one or more hemispherical projections 174 (FIG. 8B), one or more dimples 176 (FIG. 8C), or any combination thereof. In fact, the one or more turbulators may be any suitable feature positioned in the first and/or the second primary cooling passages 152A, 152B that creates turbulence therein.

Figure 9:
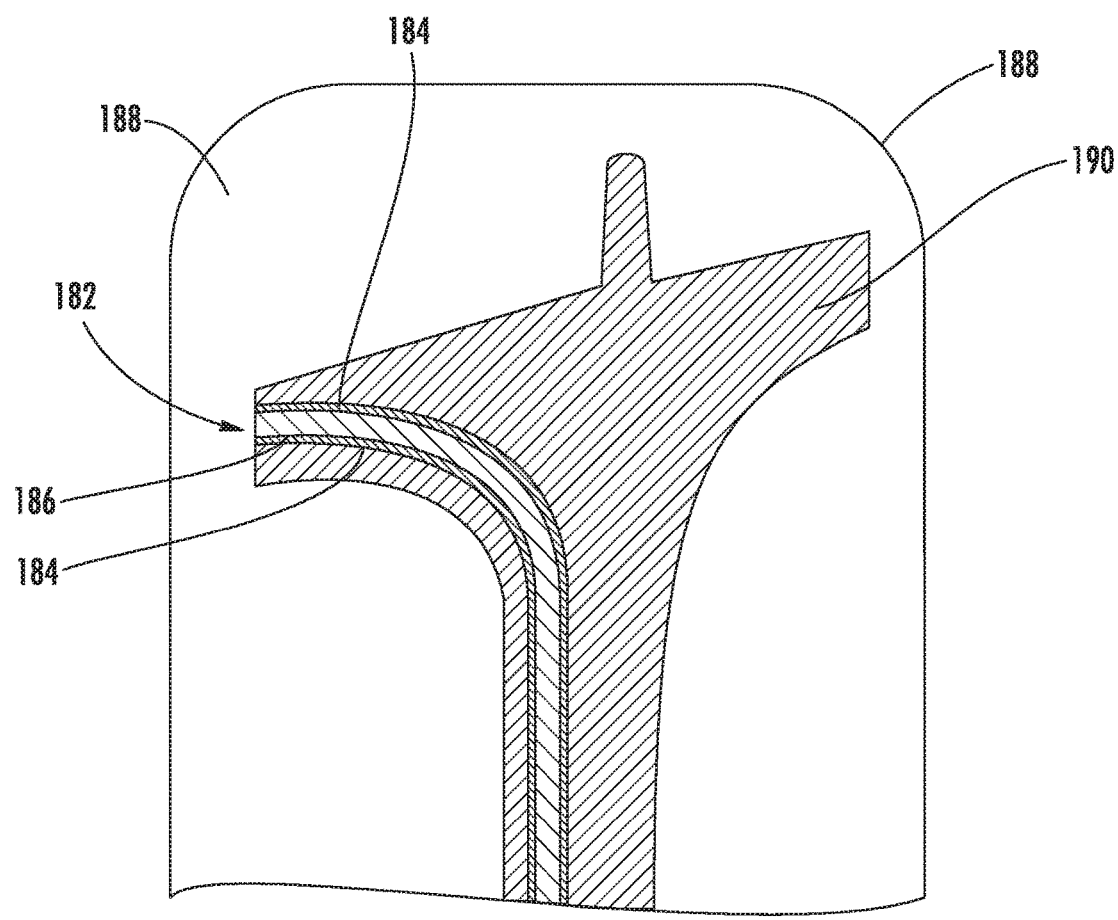
FIG. 9 is a cross-sectional view of one embodiment of a jacketed core and a mold for use in forming the first and/or the second primary cooling passage.

In some embodiments, each of the first and the second primary cooling passages 152A, 152B may be formed using a jacketed core 182. As illustrated in FIG. 9, the jacketed core 182 includes an annular sleeve 184 filled with a core material 186. In some embodiments, the annular sleeve 184 is formed from nickel or a nickel-based alloy, while the core material 186 is a refractory ceramic (e.g., silica, alumina, mullite, etc.). The jacketed core 182 may be deformed into configurations having various linear and/or curvilinear portions such as the shape of the first and the second primary cooling passages 152A, 152B. The cross-sectional shape of the jacketed core 182 may also be deformed to create the ovoid cross-section shown in FIG. 7. Once formed into the desired shape of the first or the second primary cooling passage 152A, 152B, the jacketed core 182 is positioned in a mold 188 for creating the rotor blade 100. The mold 188 is then filled with a molten material 190 (e.g., a molten nickel-based superalloy) used to form the rotor blade 100. During the casting process, the molten material 190 poured into the mold 188 absorbs the annular sleeve 184. In this respect, the materials forming the annular sleeve 184 and rotor blade 100 are sufficiently mixed such that there is no discrete boundary therebetween upon completion of the casting process. FIG. 9 illustrates the jacketed core 182 after the molten material 190 has been poured in to the mold 188, but before the molten material 190 has absorbed the annular sleeve 184. The core material 186 is then removed (e.g., via chemical leaching) from the rotor blade 100 after casting, thereby leaving the primary cooling passage. In alternate embodiments, however, the first and the second primary cooling passages 152A, 152B may be formed using any suitable method or process.

As mentioned above, the first and the second primary cooling passages 152A, 152B direct cooling air through the rotor blade 100 to cool various portions thereof. More specifically, cooling air (e.g., air bled from the compressor section 14 (FIG. 1)) enters the first and the second primary cooling passages 152A, 152B through, e.g., the intake port 124 (FIG. 2). The cooling air flows through at least the airfoil portions 156A, 156B, the transition portions 158A, 158B, and the tip shroud portions 160A, 160B of the first and the second primary cooling passages 152A, 152B. Depending on the location of the inlets, the cooling air may flow through other portions of the rotor blade 100 as well. For example, the cooling air may also flow through the root portion 122 (FIG. 2), the shank portion 116 (FIG. 2), and the platform 102 (FIG. 2) if the intake port 124 is the inlet of the first and/or the second primary cooling passages 152A, 152B. While flowing through the first and the second primary cooling passages 152A, 152B, the cooling air absorbs heat from the rotor blade 100, thereby cooling the same. That is, the heat from the rotor blade 100 is convectively transferred to the cooling air. The cooling air exits the first and the second primary cooling passages 152A, 152B through the corresponding first and second primary cooling passage outlets 154A, 154B and flows into the hot gas path 32 (FIG. 1).

Figure 10:
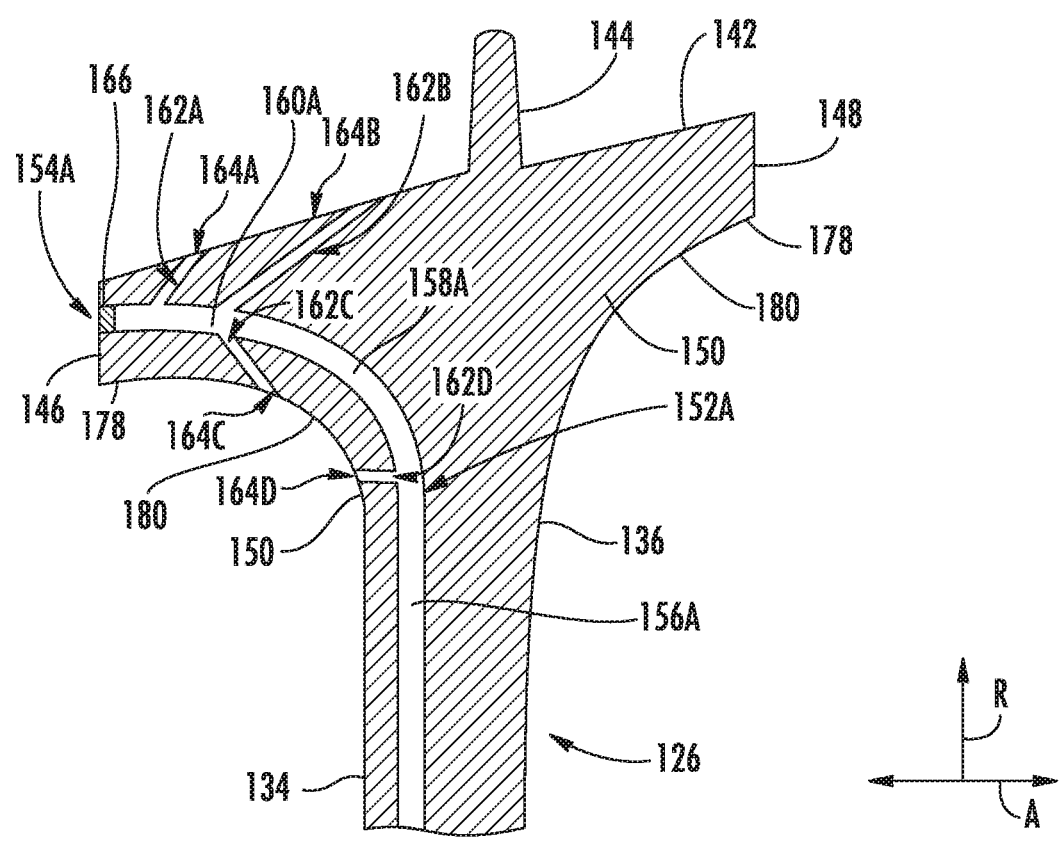
FIG. 10 a cross-sectional view of the airfoil and the tip shroud taken generally about line 5-5 in FIG. 4, illustrating a further embodiment of the first primary cooling passage.

FIG. 10 illustrates an alternate embodiment of the rotor blade 100. In this embodiment, the rotor blade 100 defines one or more secondary cooling passages therein in fluid communication with the first primary cooling passage 152A. As will be discussed in greater detail below, the one or more secondary cooling passages provide film cooling and/or additional convective cooling to the rotor blade 100 in addition to or in lieu of the convective cooling provided by the first and the second primary cooling passages 152A, 152B.

In the embodiment shown in FIG. 10, the tip shroud 128 of the rotor blade 100 defines a first secondary cooling passage 162A and a second secondary cooling passage 162B therein. The tip shroud 128 and the transition portion 150 of the rotor blade 100 collectively define a third secondary cooling passage 162C and a fourth secondary cooling passage 162D therein. In other embodiments, the rotor blade 100 may define fewer or more secondary cooling passages as are necessary or desired. Although FIG. 10 shows only the first primary cooling passage 152A, additional secondary cooling passages may be in fluid communication with other primary cooling passages (e.g., the second primary cooling passage 152B) defined by the rotor blade 100 as well.

As illustrated in FIG. 10, the first, the second, the third, and the fourth secondary cooling passages 162A, 162B, 162C, 162D respectively extend from the first primary cooling passage 152A to a first secondary cooling passage outlet 164A, a second secondary cooling passage outlet 164B, a third secondary cooling passage outlet 164C, and a fourth secondary cooling passage outlet 164D. In the embodiment shown in FIG. 10, the radially outer surface 142 of the tip shroud 128 defines the first and the second secondary cooling passage outlets 164A, 164B, while the transition portion 150 defines the third and the fourth secondary cooling passage outlets 164C, 164D. In other embodiments, one of the transition portion 150 or the radially outer surface 142 of the tip shroud 128 may define all of the first, the second, the third, and the fourth outlets 164A, 164B, 164C, 164D. Nevertheless, the first, the second, the third, and the fourth outlets 164A, 164B, 164C, 164D may be defined by any surface of the transition portion 150 or the tip shroud 128.

The first, the second, the third, and the fourth secondary cooling passages 162A, 162B, 162C, 162D may be oriented to direct cooling air onto the exterior surfaces of the rotor blade 100. More specifically, the first and the second secondary cooling passages 162A, 162B may direct air on the radially outer surface 142 of the tip shroud 128. In this respect, the first and the second secondary cooling passages 162A, 162B are preferably oriented at an angle relative to the radially outer surface 142 of the tip shroud 128. The third and the fourth secondary cooling passages 162C, 162D may direct air on the outer surface 180 of the transition portion 150. Accordingly, the third and the fourth secondary cooling passages 162C, 162D may be oriented at an angle relative to the outer surface 180 of the transition portion 150. In fact, the third and the fourth secondary cooling passages 162C, 162D may be oriented tangentially relative to the outer surface 180 of the transition portion 150. Preferably, the cooling air exits the first, the second, the third, and the fourth secondary cooling passages 162A, 162B, 162C, 162D substantially parallel to exterior surface of the rotor blade 100. Orienting the first, the second, the third, and the fourth secondary cooling passages 162A, 162B, 162C, 162D to direct cooling air onto the exterior surfaces of the rotor blade 100 facilitates film cooling thereof. In alternate embodiments, the first, the second, the third, and the fourth secondary cooling passages 162A, 162B, 162C, 162D may not direct cooling air onto the exterior surfaces of the rotor blade 100.

A plug 166 may be positioned in the first primary cooling passage outlet 154A of the first primary cooling passage 152A in embodiments that include the one or more secondary cooling passages. More specifically, the plug 166 occludes the flow of cooling air through the first primary cooling passage outlet 154A. As such, all of the cooling air present in the first primary cooling passage 152A flows into the first, the second, the third, and the fourth secondary cooling passages 162A, 162B, 162C, 162D. The cooling air then exits the rotor blade 100 through the corresponding first, second, third, or fourth secondary cooling passage outlets 164A, 164B, 164C, 164D. In this respect, the first primary cooling passage 152A serves as a plenum when occluded by the plug 166 to supply the first, the second, the third, and the fourth secondary cooling passages 162A, 162B, 162C, 162D with cooling air. The plug 166 may press fit into the first primary cooling passage 152A or otherwise fixedly couple to the tip shroud 128.

The first, the second, the third, and the fourth secondary cooling passages 162A, 162B, 162C, 162D may have any suitable configuration and cross-section. In the embodiment shown in FIG. 10, all of the first, the second, the third, and the fourth secondary cooling passages 162A, 162B, 162C, 162D are linear. Nevertheless, some or all of the first, the second, the third, and the fourth secondary cooling passages 162A, 162B, 162C, 162D may be curvilinear in other embodiments. The first, the second, the third, and the fourth secondary cooling passages 162A, 162B, 162C, 162D may have a circular cross-sectional shape or any other suitable shape. The diameters of first, the second, the third, and the fourth secondary cooling passages 162A, 162B, 162C, 162D are preferably uniform along the length thereof and smaller than the smallest diameter (e.g., the diameter 168 (FIG. 5)) of the first primary cooling passage 152A. Nevertheless, the diameters of the first, the second, the third, and the fourth secondary cooling passages 162A, 162B, 162C, 162D may be non-uniform and the same size or larger than the smallest diameter of the first primary cooling passage 152A.

The first, the second, the third, and the fourth secondary cooling passages 162A, 162B, 162C, 162D may be formed in any suitable manner. For example, the first, the second, the third, and the fourth secondary cooling passages 162A, 162B, 162C, 162D may be formed by drilling or machining the rotor blade 100 after casting. In other embodiments, the first, the second, the third, and the fourth secondary cooling passages 162A, 162B, 162C, 162D may be formed during the casting process, e.g., using the jacketed core 182 (FIG. 9).

The first, the second, the third, and the fourth secondary cooling passages 162A, 162B, 162C, 162D provide film cooling and/or convective cooling to the rotor blade 100. More specifically, cooling air flows through the first primary cooling passage 152A, thereby convectively absorbing heat from the rotor blade 100 as discussed in greater detail above. The plug 166 prevents the cooling air from exiting the first primary cooling passage 152A through the first primary cooling passage outlet 154A. As such, the first primary cooling passage 152A serves as a plenum when occluded by the plug 166 to supply cooling air to the first, the second, the third, and the fourth secondary cooling passages 162A, 162B, 162C, 162D. The cooling air then exits the first, the second, the third, and the fourth secondary cooling passages 162A, 162B, 162C, 162D through the corresponding first, second, third, and fourth outlets 164A, 164B, 164C, 164D. The cooling air may convectively absorb additional heat from the from the rotor blade 100 while flowing through the first, the second, the third, and the fourth secondary cooling passages 162A, 162B, 162C, 162D. The first and the second secondary cooling passages 162A, 162B may direct cooling air onto the radially outer surface 142 of the tip shroud 128, thereby forming a film of cooling air thereon. The third and the fourth secondary cooling passages 162C, 162D may direct cooling air onto the outer surface 180 of the transition portion 150, thereby forming a film of cooling air thereon. The films of cooling air act as a barrier to insulate the rotor blade 100 from the combustion gases 34 flowing through the hot gas path 32. In some embodiments, the secondary cooling passages may not be oriented in a manner that permits film cooling.

As discussed in greater detail above, the first and the second primary cooling passages 152A, 152B convectively cool the airfoil 126, the tip shroud 128, and the transition portion 150. More specifically, pressure-side and/or suction-side side surfaces 146, 148 of the tip shroud 128 define the first and the second primary cooling passage outlets 154A, 154B. In this respect, the first and the second primary cooling passages 152A, 152B provide increased cooling to the tip shroud 128 compared with conventional cooling passage configurations. Moreover, the first and the second primary cooling passages 152A, 152B are preferably positioned proximate to and follow the curvature of the outer surface 180 of the transition portion 150 of the rotor blade 100. As such, the first and the second primary cooling passages 152A, 152B also provide increased cooling of the transition portion 150 over conventional cooling passage configurations. In certain embodiments, the first, the second, the third, and the fourth secondary cooling passages 162A, 162B, 162C, 162D provide film cooling and/or additional convective cooling to the tip shroud 128 and the transition portion 150, thereby providing additional cooling to the rotor blade 100. Furthermore, the first and the second primary cooling passages 152A, 152B and/or the first, the second, the third, and the fourth secondary cooling passages 162A, 162B, 162C, 162D do not undesirably increase the weight of the rotor blade 100 unlike conventional cooling passage configurations.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a gas turbine engine, the rotor blade comprising:
   an airfoil;
   a tip shroud comprising a side surface and a radially outer surface; and
   a transition portion coupling the tip shroud to the airfoil;
   wherein the airfoil, the transition portion, and the tip shroud collectively define a plurality of primary cooling passages therein;
   wherein each respective primary cooling passage of the plurality of primary cooling passages comprises a first portion defined by the airfoil, a second portion defined by the transition portion, and a third portion defined by the tip shroud;
   wherein the first portion, the second portion, and the third portion of each respective primary cooling passage are fluidly isolated from the first portion, the second portion, and the third portion of all other primary cooling passages of the plurality of primary cooling passages;
   wherein the second portion of at least one primary cooling passage is curvilinear; and
   wherein the third portion of each respective primary cooling passage extends between a respective second portion and a respective primary cooling passage terminal end defined on the side surface of the tip shroud; wherein the third portion of at least one respective primary cooling passage defined by the tip shroud is curvilinear.

2. The rotor blade of claim 1, wherein the respective terminal end of at least one primary cooling passage comprises a respective primary cooling passage outlet; and wherein a pressure-side side surface of the tip shroud defines the respective primary cooling passage outlet of the at least one primary cooling passage of the plurality of primary cooling passages.

3. The rotor blade of claim 1, wherein the respective terminal end of at least one primary cooling passage comprises a respective primary cooling passage outlet; and wherein a suction-side side surface of the tip shroud defines the primary cooling passage outlet of the at least one primary cooling passage of the plurality of primary cooling passages.

4. The rotor blade of claim 1, wherein the tip shroud defines a secondary cooling passage in fluid communication with at least one primary cooling passage of the plurality of primary cooling passages.

5. The rotor blade of claim 4, wherein the secondary cooling passage extends from the at least one primary cooling passage to a secondary cooling passage outlet defined by the radially outer surface of the tip shroud.

6. The rotor blade of claim 4, further comprising:
   a plug positioned in the third portion of the at least one primary cooling passage, wherein the plug occludes fluid flow through the terminal end of the at least one primary cooling passage to direct fluid flow through the secondary cooling passage.

7. The rotor blade of claim 4, wherein the secondary cooling passage is linear.

8. The rotor blade of claim 6, wherein the tip shroud and the transition portion collectively define the secondary cooling passage; and wherein the secondary cooling passage extends from at least one primary cooling passage of the plurality of cooling passages to a secondary cooling passage outlet defined by an outer surface of the transition portion.

9. The rotor blade of claim 1, wherein the second portion of the at least one primary cooling passage that is curvilinear has a first diameter; and wherein the first portion fluidly connected to the curvilinear second portion has a second diameter, the second diameter being less than the first diameter.

10. The rotor blade of claim 9, wherein the first portion of at least one respective primary cooling passage defined by the airfoil is linear.

11. The rotor blade of claim 1, wherein at least one respective primary cooling passage comprises one or more turbulators.

12. The rotor blade of claim 1, wherein the terminal end of at least one primary cooling passage comprises a primary cooling passage outlet having an ovoid cross-section.

13. A gas turbine engine comprising:
    a compressor portion;
    a combustion portion; and
    a turbine portion comprising one or more rotor blades, each rotor blade comprising:
      an airfoil;
      a tip shroud comprising a side surface and a radially outer surface; and
      a transition portion coupling the tip shroud to the airfoil;
      wherein the airfoil, the transition portion, and the tip shroud collectively define a plurality of primary cooling passages therein;
      wherein each respective primary cooling passage of the plurality of primary cooling passages comprises a first portion defined by the airfoil, a second portion defined by the transition portion, and a third portion defined by the tip shroud;
      wherein the first portion, the second portion, and the third portion of each respective primary cooling passage are fluidly isolated from the first portion, the second portion, and the third portion of all other primary cooling passages of the plurality of primary cooling passages;
      wherein the second portion of at least one primary cooling passage is curvilinear; and
      wherein the third portion of each respective primary cooling passage extends between a respective second portion and a primary cooling passage terminal end defined on the side surface of the tip shroud; wherein the third portion of at least one respective primary cooling passage defined by the tip shroud is curvilinear.

14. The gas turbine engine of claim 13, further comprising:
    a secondary cooling passage that extends from at least one primary cooling passage of the plurality of primary cooling passages to a secondary cooling passage outlet defined by the radially outer surface of the tip shroud.

15. The gas turbine engine of claim 14, further comprising:
    a plug positioned in the third portion of the at least one primary cooling passage, wherein the plug occludes fluid flow through the terminal end of the at least one primary cooling passage to direct fluid flow through the secondary cooling passage.

16. The gas turbine engine of claim 13, wherein the tip shroud and the transition portion collectively define a secondary cooling passage;
   wherein the secondary cooling passage extends from at least one primary cooling passage to a secondary cooling passage outlet defined by an outer surface of the transition portion; and
   wherein a plug is positioned in the third portion of the at least one primary cooling passage to occlude fluid flow through the terminal end of the at least primary cooling passage and to direct fluid flow through the secondary cooling passage.

17. The gas turbine engine of claim 13, wherein the second portion of the at least one primary cooling passage that is curvilinear has a first diameter; and wherein the first portion fluidly connected to the curvilinear second portion has a second diameter, the second diameter being less than the first diameter.

18. The gas turbine engine of claim 17, wherein the first portion of at least one primary cooling passage defined by the airfoil is linear.

* * * * *